Dec. 1, 1936.  E. A. BIGLER  2,062,738

AUTOMATIC FARM GATE

Filed May 12, 1934  4 Sheets-Sheet 1

Edward A. Bigler INVENTOR.

BY: A. B. McCall
ATTORNEYS.

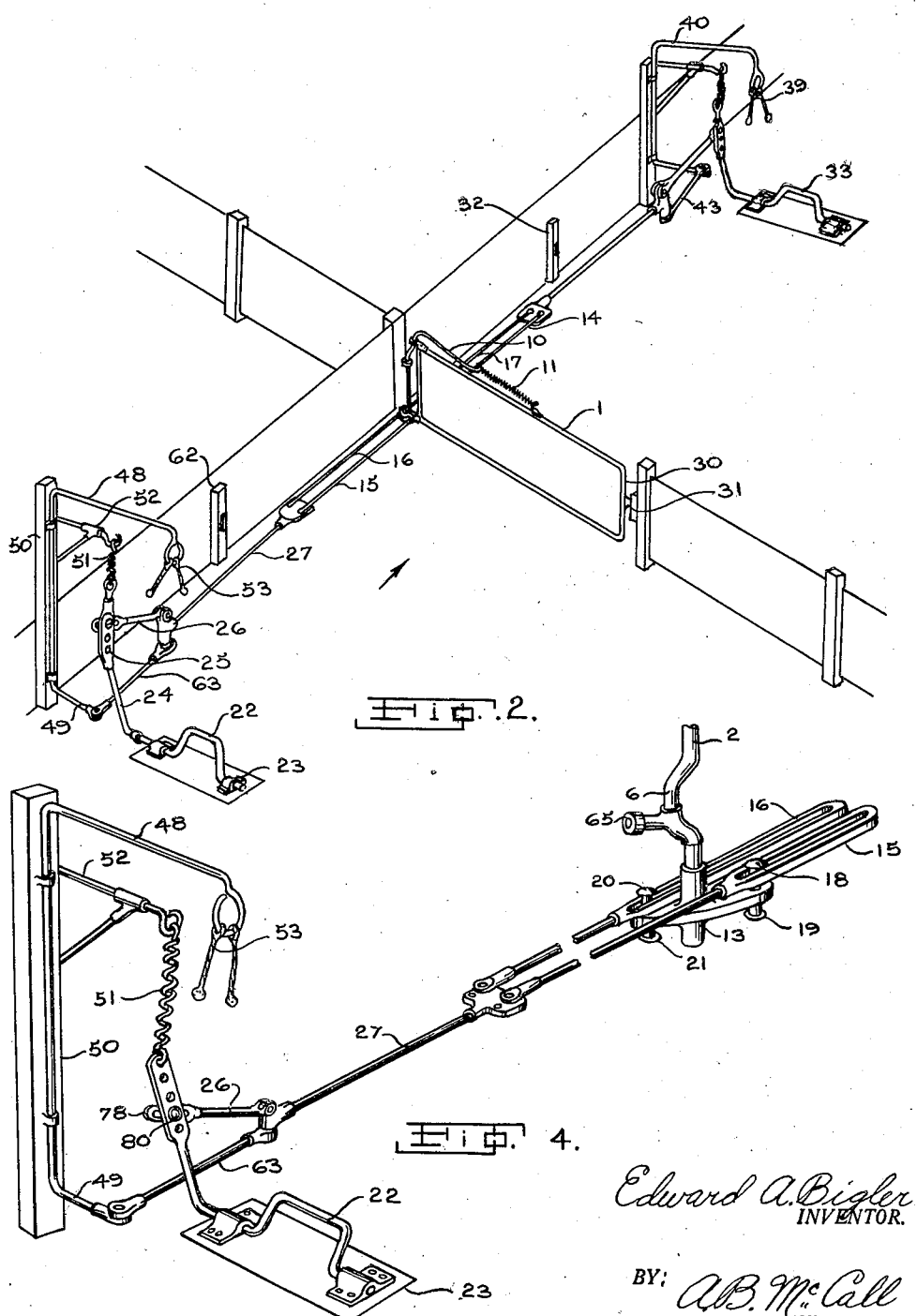

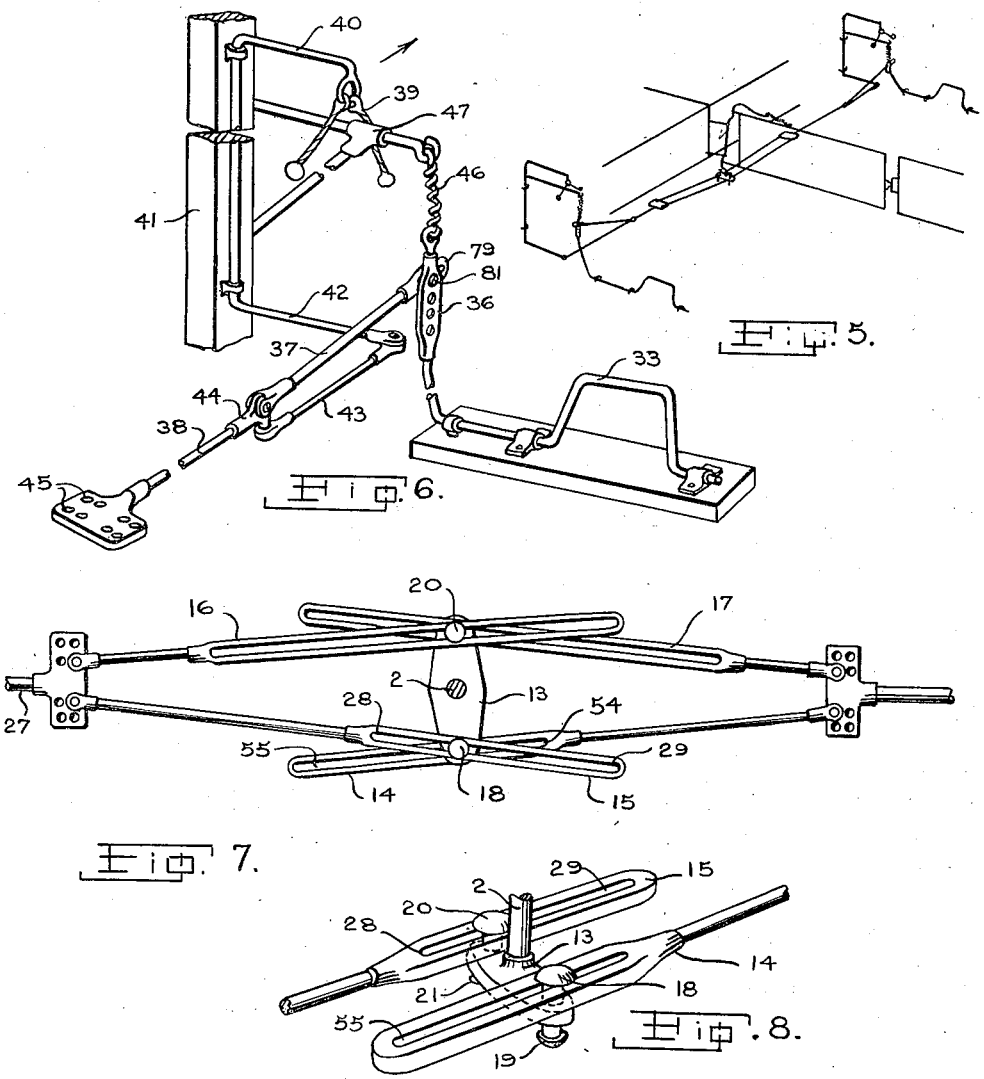

Dec. 1, 1936.  E. A. BIGLER  2,062,738
AUTOMATIC FARM GATE
Filed May 12, 1934  4 Sheets-Sheet 4

Edward A. Bigler
INVENTOR.

BY A.B.McCall
ATTORNEYS.

Patented Dec. 1, 1936

2,062,738

UNITED STATES PATENT OFFICE 2,062,738

AUTOMATIC FARM GATE

Edward A. Bigler, Auburn, Ill.

Application May 12, 1934, Serial No. 725,309

3 Claims. (Cl. 39—55)

My invention relates to gates and more especially to gates for vehicles or live stock and the like and has for its objects to provide a means of opening and closing the gate with ease and without the driver getting out of the vehicle.

A further purpose of my invention is to provide a gate for vehicles and the like which may be not only opened by the vehicle in either direction and closed but which may be adjusted to open in only one direction where necessary for instance on a hill side. This gate is equipped also to permit it to be controlled by hand rope pull method for one or both directions swinging from the closed position.

I attain the objects of my invention by the gate described in the annexed specification, recited in the claims and illustrated in the accompanying drawings in which like reference numerals indicate like parts in the several figures.

Referring to the figures:

Figure 2 is a bird's eye view of my automatic gate and control assembly.

Figure 4 is a detail of the control lever mechanism for the control of the gate by vehicles or by the rope pull method.

Figure 5 is a diagrammatic view in a sort of "bone-man" illustration of the control system for my gate.

Figure 6 is a second detail showing more completely the rope pull and vehicle trip lever controls for my gate in the opposite arrangement from that shown in Figure 4.

Figure 7 is a top or plan view showing in a detail the operative connection between the push link members and the crank pin members on the base lever of the crank axis.

Figure 8 is a detail showing the manner of connecting the push rods with the crank axis where the gate is to swing only in one direction.

Figure 1:
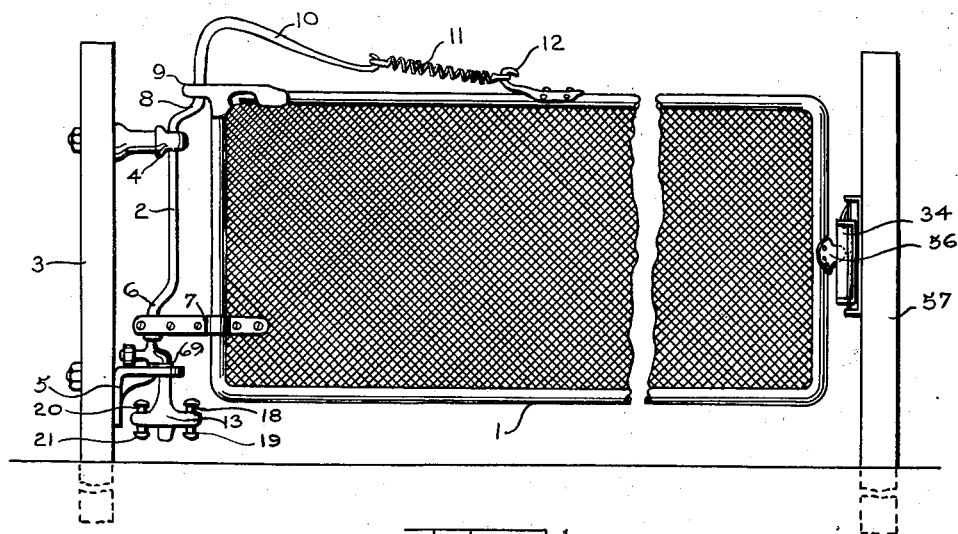
Figure 1 is a front view of the gate of my invention.

I have previously contributed certain features of improvement to the automatic gate art and have secured patent protection thereon, as Patent Number 1,476,354 issued December 4, 1923, and I have recently developed new features in this art teaching new and novel adaptations of mechanical principles which have proven positively successful in my tests.

I am aware of the fact that a vehicle gate to work automatically must be reasonably economical to build and simple to operate if it is to be a success commercially, and it is to this end that I have developed this invention.

In order to disclose and describe the merits of my invention the following description when taken with the drawings will amply reveal the essential features thereof.

Referring now to the drawings I provide in the preferred arrangement of my invention a gate 1 (Fig. 1) operatively supported on an upright crank axis 2 having a post or other suitable support 3 with support brackets 4 and 5 secured thereto.

An essential feature of the operating mounting for my gate is the crank arrangement provided in crank axis 2 wherein an outer crank 6 supports lower hinge 7 of the gate and an inner crank 8 supports upper hinge 9 of the gate.

A spring lever 10 either forming an integral part of crank axis 2 or a lever attached thereto establishes through a spring 11 and hook 12 a means of effecting a substantial pull on the gate during the opening operation.

For instance the gate normally stands closed as shown in Figure 1 and the force required for opening the gate is applied to crank axis 2 at the bottom end lever 13 through push links 14, and 15 slidably engaging crank pins 19 and 18 respectively where a gate is to be swung in either direction, and the force used to close the gate is applied through pull links 16 and 17 slidably engaging crank pins 20 and 21 respectively.

Referring now to Figure 2 for a study of the operating features of my gate when it is desired for instance, to drive out of the gate 1 in the direction indicated by the arrow, if the operator is in a vehicle, it will cause the wheel of the vehicle to run against a trip lever 22 having its anchorage in the ground upon a block 23 and forcing this lever forward toward the gate causing arm 24 to swing forward with an adjustment link 25 pivotally pushing on a connecting rod 26 forcing push rod 27 forward with push links 15 and 16 (Fig. 7).

Figures 3, 9:
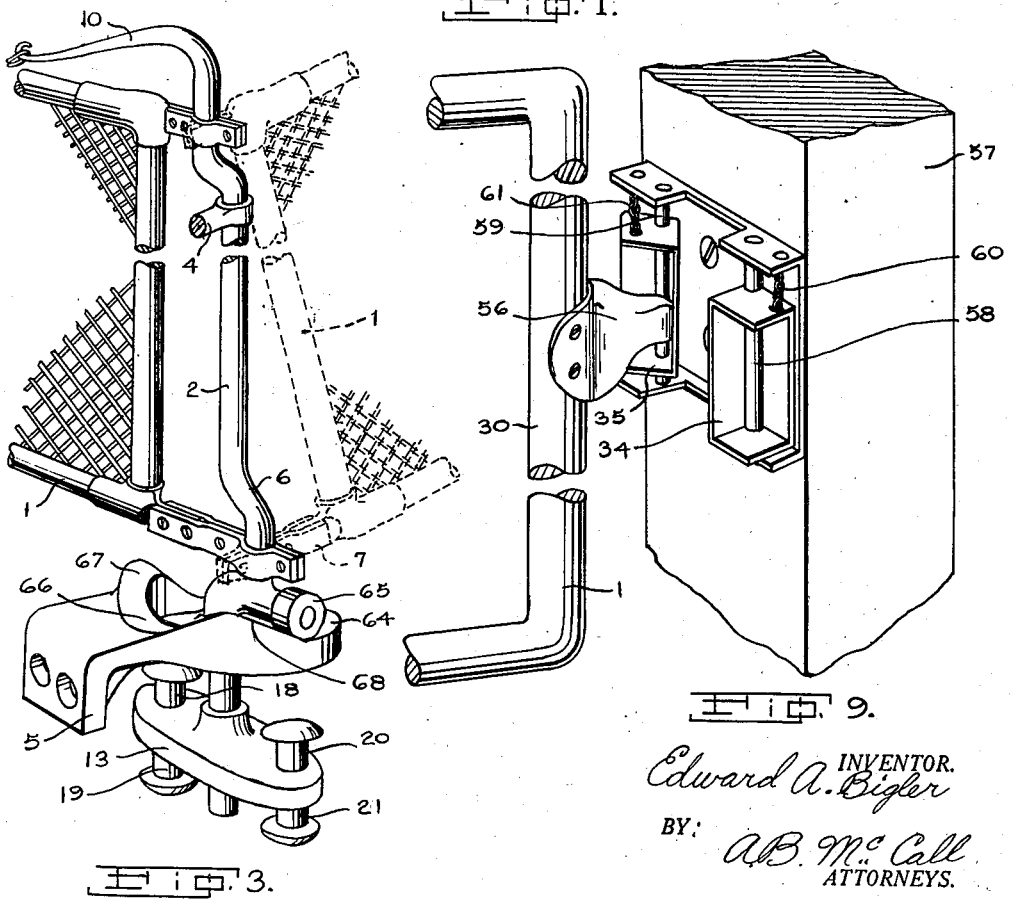
Figure 3 is an enlarged detail of the crank axis construction and the gate attachments with gate in opened position. Dotted lines in this figure indicate the gate lifted to an inclined position ready to swing open.
Figure 9 is a detail of a gate latch with a portion of the gate shown swinging into closed position.

Link 15 slidably engaging pin 18 at the rear end 28 of slot 29 is then caused to rotate crank axis 2 through an arc of approximately 70 degrees. This rotation of crank axis 2 has the effect of pushing the lower end of gate 1 (Fig. 3) away from a vertical line and pulling the top part of the gate in the opposite direction. This tilts the gate as shown in Fig. 3, lifting the free end 30 (Fig. 2) out of the latch 31 and causing the gate to swing by gravity into the open position shown by the solid lines in Figure 3. The momentum of the gate will cause it to swing through a complete arc of 90 degrees although the pin 19 and the axis 2 have been moved through an arc of only about 70 degrees.

In this opened position free end 30 of gate 1 swings around against a bumping post 32 and remains there until it is released for closure. After the driver drives through the gate the gate may be closed by driving against the trip lever 33 causing slotted pull link 17 to pull against pin 21 (this pin is shown in Fig. 8) forcing gate 1 readily back to a closed position where it comes to rest between latch members 34 and 35. (Fig. 9).

When the wheel of the outgoing vehicle strikes trip lever 33 then the adjustable link 36 (Fig. 6) effects the pulling movement over pull link 17 through connecting rod 37 and rod 38. The slotted link connection 79 (Fig. 6) is used in connecting rods 37 and 26 (Fig. 2) in order to transmit the same degree of motion to the push links 14 and 15 and pull links 16 and 17 when trip levers 22 and 23 are pushed forward as when these levers are pushed in the opposite direction.

It will be observed that my gate is equipped with means for opening and closing it by a rope pull hand control arrangement wherein a pedestrian may pull on rope 39 (see Fig. 6) in the direction indicated by the arrow to close the gate and this pull against lever 40 supported on a post 41 effects a swinging movement on lever 42 pulling back on connecting rod 43 secured to the attachment 44 engaging rod 38 to which pull link 17 is adjustably secured through holes 45. This link 17 in closing the gate pulls back on pin 21 (see Fig. 8 for this pin) on the side next to the gate post 3.

It will be noted that a tensile spring 46 (Fig. 6) establishing connection between a supporting bracket 47 on post 41 and link 36 provides a means of retracting the push rods and control levers back to their normal position whenever the control members are released. Thus when trip levers 22 and 33 are released from the vehicle wheel's contact in passing over it then either of these levers will be caused by their respective springs to fly back to their normal position for further engagement. This is also true of levers 40 and 42 on post 41 as rope 39 is released; while in like manner levers 48 and 49 on post 50 (Fig. 2) will be pulled back into normal position by spring 51 on bracket 52 after the operator releases rope 53 in the hand control of the gate.

Where it is desired to go through the gate in the opposite direction in a vehicle the driver will cause the vehicle wheel to strike trip lever 33 (Fig. 2) which through its connecting controls causes slotted push link 14 to slide on pin (this pin shown in Fig. 8) until the end 54 of slot 55 strikes pin 19 thus forcing the gate open ahead of the vehicle and in the opposite direction from that hereinabove described for opening the gate.

Thus it will be seen that in this operation the crank axis 2 pivotally turns shifting the supported end of the gate to an inclined axis position of support in the opposite direction from that shown in Figure 3 where, with the free end of the gate lifted thus above latches 34 and 35 (Fig. 9) clearing lug 56 the gate will swing open in the opposite direction to the first described manner. These latches are supported on a gate post 57 in a position where the gate will not have to be lifted too high to get above them.

Latch members 34 and 35 are each slidably pivoted respectively on upright pins 58 and 59 while a member 60 for latch 34 and 61 for latch 35 are respectively adapted to pull these latch members back by a pendulum action into normal resting position where they hold the gate shut.

While I prefer to use the latch just described it is obvious that my invention will work equally well with any of the usual type latches where the gate is released by lifting the engaging member out of the latch, where the latch is of a type that will work positively and quickly.

It will be observed that when the gate is thus swung open in the opposite direction after being tilted the spring 11 (Fig. 2) on lever 10 having given the gate a boost in its opening movement brings the gate against the bumping post or stop member 62. The gate may then be closed by causing the vehicle wheel to strike trip lever 22 as it pulls away from the gate causing pull link 16 with its connecting control members to close the gate by pulling against pin 20 (Fig. 7).

In like manner the gate may be thus also closed by pulling on rope 53 (Fig. 2) in a direction away from the gate effecting a control movement of pull link 16 through levers 48, 49, 63, 27, and down to 16.

In the operative support of gate 1 supported by crank axis 2, the first action on the axis 2, when the vehicle wheel approaching the gate from either side and contacting the vehicle control levers 22 or 33, to exert a forceful rotation of axis 2, in its upright support bracket 5 from its position as shown in Fig. 1, normally aligned in the plane of the closed gate, around to a position as is illustrated in Fig. 3, at a substantial angle with the plane of the closed gate and approximately in the plane of the open gate position. This vigorous swing of the crank axle 2 lifts gate 1 at its free end out of engagement with its latch and in lifting it, tilts the gate so that it swings by gravity around to an open position. Thus, when the crank axis has been forcefully turned to approximately the plane of the open gate before the gate has had time to swing around to that position, the axis must be effectively held and its rotated position as the force of gravity and the tensile spring 11 pulled by the rotated arm 10 can have time to swing the gate around to its open position.

Thus, in order to hold axis 2 in its rotated position until the gate can swing around, it is essential that means be provided to perform this holding function and in this instance, have provided raised positions 67 and 68 in cam race 64 carrying roller 65. Thus, when the gate is closed, roller 65 will rest in the central depression 66 of race 64 but when the gate is opened in either direction from the rotation of crank axis 2, the roller 65 will roll up over humps 67 and 68 and will roll down the incline on the opposite sides of these humps, (depending upon which way the gate is open). These inclines in roller race 64 will tend to serve as a resistance against crank axis 2, swinging back to the plane of the gate's closed position when the weight of the opening gate is swinging on it.

It will thus be obvious that when roller 65 rests in the central low portion 66 of race 64 or at the low position 66 of race 64 when the gate is open, there will be a tendency for the crank axis 2 to be steadied in the gate's closed or open position.

On certain occasions, however, it may be desirable to lift the crank axis 2 up where roller 65 will clear points 67 and 68 as the gate swings and in such cases a washer or sleeve 69 may be used for holding the entire axis 2 up to such elevated position.

In Figure 8 there is shown a detail illustrating the manner in which push links 14 and 15 may be slidably connected to pins 18 and 20 respectively where it may be desired to swing the gate only in one direction on a hill side, for instance.

In this arrangement link 15 through its control connections for hand and vehicle control will open the gate around toward bumper 62 (Fig. 2) having a latch thereon to hold the gate open. Then when the gate is to be released from its opened position to swing it shut the crank axis 2 is rotated either by hand or vehicle control causing it to be lifted off the latch that holds it open.

After passing through the gate it may then be closed by manipulating rope 39 in a direction away from the gate or trip lever 33 in a like direction for pulling back push link 14 until the free end of slot 55 (Fig. 7) engages pin 18 and rotating crank axis 2 to force the gate to a closed position.

It will be thus observed that regardless of which direction one may be travelling through the gate when the gate is open it may be closed by pulling on the rope pull away from the gate on either side of the gate or by tripping the trip lever 22 or 33 in a direction away from the gate.

It will be further observed that booster spring 11 (Fig. 11) operating in conjunction with spring 10 will accelerate the movement of the gate in either direction from its normally closed position or back toward its closed position from either side when closing the gate.

Figure 10:
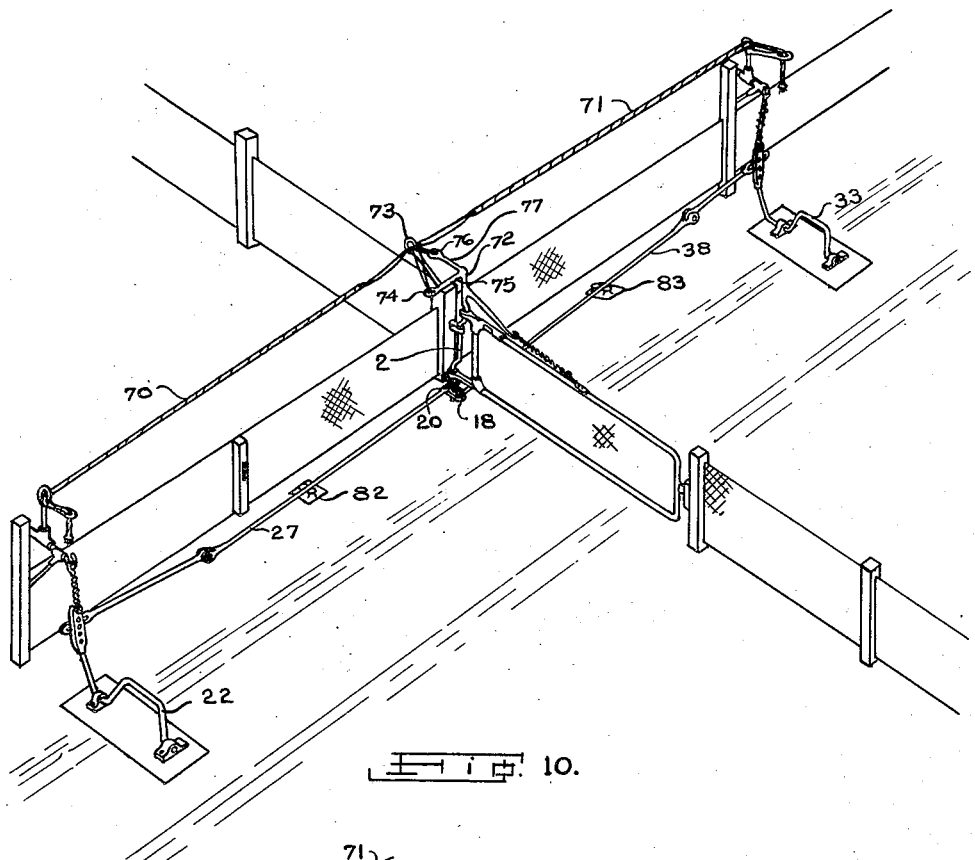
Figure 10 is a perspective showing a one-way gate with vehicle control and with a one-way rope pull control.

In Figure 10 which illustrates a one-way gate with the controls therefor manipulated from either side of the gate the trip lever 22 controllably connects with pin 20 while trip lever 33 controllably connects with pin 18. With this type of crank axis for control of the gate there will be within the scope of my invention an independent rope pull control where the operator may swing the gate in one direction by pulling on rope 70 or rope 71 connected with an upright rod 72 attached to and adapted to actuate crank axis 2. Rope 70 passing through loop 73 attaches to the end 74 of lever arm 75 and also attaches to end 76 of lever arm 77 while rope 71 is secured through loop 73 to end 74 of lever arm 75. Rope 71 has two connections, one of which engages end 74 on arm 75 and the other engages end 76 on arm 77. In like manner rope 70 thus has two connections, one of which engages end 74 and the end 76. This will permit a complete control of the gate by rope pull as desired causing the gate to swing on crank axis in the same manner that it swings when operating in the above mentioned controls.

Thus it may be observed that my gate may open in either direction by a vehicle or by a hand lever and may be closed from either direction by a hand lever and by tripping the trip-lever in a direction away from the gate by a vehicle or by a pedestrian or my gate may be opened from either side to swing in only one direction and may be closed from either side and in both instances the actuating means either hand control or vehicle control.

I have thus shown how my gate invention may conveniently and successfully control the movement of a farm gate for instance in both directions from its closed position and how such movement may be effected either by vehicle or by hand control. I have also shown how the gate may be successfully opened and closed in one direction only if needed on a hill side for instance, with the control thereof operated from either side of the gate either by vehicle or by hand. This principle I have by actual test proven to be wholly practical and successfully operative.

Figure 11:
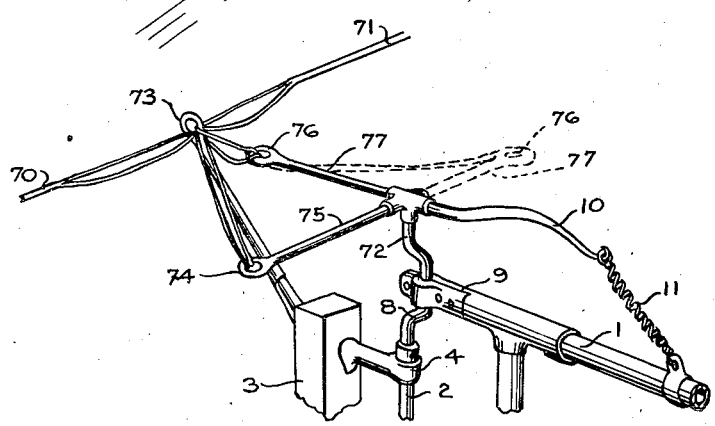
Figure 11 is a detail showing the operating connection of the one-way rope pull control with the gate.

It will be observed in Figure 10 for instance, as well as Figure 11 that since my gate is mounted on a crank axis of this novel construction it may be very easily and conveniently controlled as a one-way gate merely by rope pull hand operation in which case if desired the trip-lever and push rod mechanism may be entirely omitted.

It will be further observed (see Figure 2) that horizontal hand control bars 40 and 48 may be allowed to extend at a suitable distance out toward the road to be conveniently manipulated without ropes 39 and 53 attached thereto.

It will also be observed that the salient features of my invention where it may be necessary to swing the gate in only one direction will permit the same to be operated solely by the rope pull method if desired without the use of any vehicle control attachments; but such attachments may be operatively added later if desired.

Having thus described the nature of my invention what I claim is:

1. An automatic farm gate comprising in cooperative combination a gate body, an upright central post adjacent one end of the gate, an upright crank axis pivotally disposed uprightly with an inner crank adjacent the top of the gate and hingedly connected therewith and an integral outer crank adjacent the bottom of the gate and hingedly connected therewith; said crank supported by said upright post and supporting said gate, a crank lever at the base of said axis and having crank pins adjacent the ends of oppositely disposed arms of said lever, a pair of vehicle trip-levers disposed in a drive-way extending through the gate, gate control rods slidably engaging said crank pins of said crank axis supporting said gate; said crank axis provided with a top extension arm extending out over said gate and a tensile spring establishing connection between the top of said gate and said extension arm; whereby said gate may be opened by a vehicle, and automatically closed and accelerated in its opening movement when started; and whereby said gate is caused to tilt with its axis to an inclined position causing the gate to lift and unlatch and to swing open on the inclined axis.

2. An automatic farm gate construction and means for the control thereof comprising a gate body, an upright crank axis therefor having an inner crank adjacent the top and an outer crank adjacent the bottom, a gate post for the support of the gate, a pair of bracket hinges supporting said crank axis and a pair of gate hinges on said gate respectively engaging said inner crank of the axis above and said outer crank of the axis below; said crank axis having a top extension toward said gate and a tensile spring establishing connection between the middle portion of said gate along the top and said extension member of the crank axis, a base crank member integral with said upright axis extending in opposite directions at right angles thereto and provided with upright crank pins adjacent the ends thereof, a vehicular actuated trip-lever disposed within the drive-way through the gate on each side of the gate, a push rod in the form of a yoke slidably connected with each of said upright crank pins from each side of the gate on said base lever member of the crank axis; a spring secured to each of said trip-levers for automatically retracting said rods to normal position which is where these rods should be when the gate is latched in its closed or opened position; whereby said gate may be opened from each side by a vehicle wheel contact, and accelerated in its opening movements by said spring over the gate in its connection with said top extension arm of the crank axis; and whereby said gate when being opened has its support end tilted to an inclined position lifting the free end of the gate and releasing the gate from the latch therefor; and causing the gate to swing open on the inclined axis.

3. As an automatic farm gate the combination for opening the gate in one direction and comprising a gate body, an upright crank axis having oppositely disposed crank portions adjacent opposite ends and an upright support member for the support of the gate, hinge members on said gate at the top and bottom and respectively engaging said crank members of said upright axis and hinge brackets on said upright support pivotally supporting said axis; said crank axis provided with a bottom crank arm having extensions in opposite directions from said axis with said gate and operatively secured slidably and respectively to crank pins on opposite ends of said base crank member of the crank axis, a spring secured to said actuating means for retracting said actuating means to normal position immediately after the gate is started on its swinging movement to opened or closed position, automatic latch for holding said gate in opened or in closed position until moved by said actuating means.

EDWARD A. BIGLER.